(12) United States Patent
Michel

(10) Patent No.: US 6,206,121 B1
(45) Date of Patent: Mar. 27, 2001

(54) VEHICLE WITH A RESILIENTLY SUSPENDED CAB PART, PARTICULARLY A DRIVER'S CAB

(75) Inventor: Luc Michel, Jouy-le-Moutier (FR)

(73) Assignee: Etablissements Michel (FR)

( * ) Notice: Subject to any disclaimer, the term of this patent is extended or adjusted under 35 U.S.C. 154(b) by 0 days.

(21) Appl. No.: 09/194,976

(22) PCT Filed: Jun. 2, 1997

(86) PCT No.: PCT/FR97/00955

§ 371 Date: May 6, 1999

§ 102(e) Date: May 6, 1999

(87) PCT Pub. No.: WO97/46439

PCT Pub. Date: Dec. 11, 1997

(30) Foreign Application Priority Data

Jun. 3, 1996 (FR) .................................................. 96 06809

(51) Int. Cl.[7] .......................... B62D 33/10; B62D 33/077
(52) U.S. Cl. ................................ 180/89.13; 296/190.07
(58) Field of Search .......................... 180/89.12, 89.13, 180/89.14; 296/190.01, 190.07

(56) References Cited

U.S. PATENT DOCUMENTS

| 3,085,817 | 4/1963 | Krause et al. | 180/124 |
| 4,141,429 | * 2/1979 | Hale | 180/89.14 |
| 4,149,608 | * 4/1979 | Hennessey | 180/89.14 |
| 5,299,651 | * 4/1994 | Wilson | 180/89.12 |
| 5,368,118 | 11/1994 | Hoefle | 180/89.12 |
| 5,590,733 | * 1/1997 | Ljungholm et al. | 180/89.14 |

FOREIGN PATENT DOCUMENTS

| 30 00 606 | 7/1981 | (DE) . |
| 93 12 640 | 1/1994 | (DE) . |
| 1 562 181 | 4/1969 | (FR) . |
| 2 649 769 | 1/1991 | (FR) . |
| 1 487 066 | 9/1977 | (GB) . |

* cited by examiner

Primary Examiner—Brian L. Johnson
Assistant Examiner—Tony Winner
(74) Attorney, Agent, or Firm—Piper Marbury Rudnick & Wolfe

(57) ABSTRACT

A vehicle comprising a frame and a cab or the like supported by the frame by a resilient suspension, the resilient suspension is essentially constituted by a main U-shaped torque rod interposed in slanting or horizontal position between the frame and the cab, a main actuator being associated to the said main torque rod to determine its neutral position.

11 Claims, 8 Drawing Sheets

VEHICLE WITH A RESILIENTLY SUSPENDED CAB PART, PARTICULARLY A DRIVER'S CAB

FIELD OF THE INVENTION

The present invention concerns improvements made to the resilient suspension of the cab or cab part, and particularly the driver's cab, of vehicles, in particular land vehicles.

BACKGROUND OF THE INVENTION

This type of suspension applies most particularly to the suspension of cabs of all-terrain vehicles such as works vehicles (public works, farm work especially to farm tractors, forestry work, mines, etc.), but also to the suspension of lorry cabs, and could have applications in other fields.

It is known, for example in respect of farm tractors or lorries, for the driver's cab to be disconnected from the frame and for suspension means to be interposed and placed at the four corners of the cab with either a passive structure (springs, shock mounts), or an active for example pneumatic structure (for example FR 2 661 387). However, this type of suspension only acts vertically and does not offset the transverse motions to which the cab is subjected.

Crossbars have also been connected to the previous components in an attempt to stabilise the cab (see for example FR 2 675 456, FR 2 653 733, FR 2 607 459): but this solution, although managing to improve the vertical suspension, has not had a satisfactory outcome in terms of damping transverse motions of the cab.

The use of torque rods can certainly allow cab stabilisation to be improved, but the result is an increase in the number of connections between the frame and the cab: vibrations of the frame are then easily transmitted to the cab and the noise level in the latter is relatively high. The document DE.A.30 00 606 shows such an arrangement with torque rods.

Lastly, stabilising devices use numerous active driving components which considerably increase the cost of the installation and do not encourage the idea of their introduction as standard to vehicles which are not top of the range vehicles.

SUMMARY OF THE INVENTION

The object of the invention is thus essentially to overcome the drawbacks and shortcomings disclosed by the prior art, and to offer an improved technical solution for the effective suspension and stabilisation of a vehicle cab relative to the frame, which uses a small number of parts connecting the frame and the cab so as to reduce the transmission of noise in the latter, which uses a very small number of active actuators so as to reduce the cost of the installation, and which to very great advantage uses combinable but distinct subassemblies to provide the various types of compensation (vertical suspension, pitching compensation, rolling compensation, front-rear shock absorption) so as to constitute a modular structure enabling user requirements to be met exactly.

All things considered, the invention aims to offer an improved solution which is more effective and less expensive than currently known solutions, and the modular structure of which admits of multiple uses.

To these ends, a vehicle comprising a frame and a cab or cab part or the like supported by said frame by resilient suspension means is characterised essentially, being arranged according to the invention, in that the resilient suspension means are essentially constituted by a main U-shaped rod interposed in an inclined or horizontal position between the frame and the cab, a main actuator being connected to said main U-shaped rod to determine its neutral position. Said main actuator may be a passive actuator (spring, possibly connected to a shock absorber for example) or else an active actuator (for example a hydraulic or air jack possibly connected to a shock absorber).

Certainly, it is already known for at least one U-shaped rod to be interposed between a frame and a cab part, for example, a driver's cab, resiliently suspended on the latter, as shown for example in the already mentioned document FR 2 607 459. However, such a U-shaped rod functions exclusively as an anti-roll rod and in no way functions as the main resilient suspension feature of the cab on the frame, the main suspension function being allocated to a set of components (springs and shock absorbers) placed at the corners of the cab according to a conventional configuration set out above and with the aforementioned associated drawbacks.

The fact of providing the main suspension with a single solitary U-shaped rod considerably restricts the connections between the frame and the suspended cab: the rod is fixed by one (or two) mounting(s) at its base and by two rotating articulations at the ends of its arms respectively. Sound bridges between cab and frame are thus reduced, and, when the cab part thus suspended is the vehicle driver's cab, the soundproofing of the latter can be very markedly improved, and at less cost, compared with current practice.

In addition, the U-shaped rod constituting the sole main suspension component, the cost of the cab suspension is markedly reduced.

Lastly, as will become clear later, it is possible to connect to this simple elementary main suspension other components appropriate for providing additional functions. It is thus possible to constitute a modular system allowing different levels of technical equipment and price which is able, from a minimum structure constituted by the U-shaped rod main suspension, to equip various ranges of vehicle: adaptation can be made on demand as a function of the technical and economic requirements to be met and the result is a marked reduction in the cost of each individual piece of equipment whatever its level of efficiency.

In a practical version which seems bound to be generally favoured, the U-shaped base formed by the main rod is fixed to the frame and the free ends of the arms of said U are fixed to the cab.

As regards the placing of the main suspension rod, it may be anticipated, also as a general rule, that the arms of the main U-shaped rod extend parallel to the vehicle longitudinal axis and are located approximately symmetrically relative to said axis; equally well then, as a function of the general configuration of the vehicle and the available space between the frame and the suspended cab, the base of the main U-shaped rod may be located approximately under the rear of the suspended cab, with the two arms pointing forwards, or else the base of the main U-shaped rod may be located approximately under the front of the suspended cab, with the two arms pointing backwards. But it would also be conceivable for the main rod to be placed transversely to the frame.

It is highly desirable to ensure that to the resilient suspension means are additionally connected cab pitching motion control means, which means may be designed in any ways suitable to meet the objective sought. However, in order to retain a simple and inexpensive structure and in order to ensure structural independence with the main suspension means so as to retain a modular aspect to the equipment, use may, preferably, be made for example of one of the following arrangements: pitching motion control means include a secondary U-shaped rod interposed between the frame and the cab, this secondary rod determining at least a third support point of the cab not aligned with the two support points determined by the main rod; or else include at least one rod or strut parallel to the arms of the main U-shaped rod connected with articulations to the cab and to the frame, said rod extending outside the plane defined by the main U-shaped rod in such a way that a deformable parallelogram layout is formed and interposed between the cab and the frame; or else again include at least two superposed cross belts, integral with the frame, determining a race for two rollers, separated longitudinally from each other and supported by the cab.

It is also possible to ensure that to the resilient suspension means are additionally connected cab rolling motion control and transverse attitude correction means, the main U-shaped rod being constituted by two half-rods the respective arms of which are angularly independent of each other and between which are interposed said rolling movement control means.

Then it is possible to use one of the following particular arrangements in which the rolling motion control means include:

- shock absorption means interposed between one of the arms and a strut which is integral with the other arm being located close by and above or below the aforesaid first mentioned arm;
- an oscillating crossbar which is supported centrally and which joins together the two arms of the main U-shaped rod, second actuator means being connected to said crossbar to bring about its controlled oscillation;
- shock absorption means in a deformable rhombus determined by one of said arms, an auxiliary arm integral with the other arm and two rods articulated on these and articulated to each other with bi-directional resilient retraction.
- contra-rotating rotating components appropriate for converting the displacement travel of one of the arms in one direction into displacement travel in the opposite direction and of the same amplitude of the other arm.

To advantage, it is possible to ensure that to the resilient suspension means are additionally connected front-rear shock absorption means which are interposed between the frame and the suspension means of the cab so that, particularly when the suspended cab is the vehicle driver's cab, the cab occupants and particularly the driver do not experience the violent jolts caused for example by a trailer coupled to the vehicle. These front-rear shock absorption means may, in a simple way, include a sub-frame oscillating mounted freely rotating on the frame and supporting the main U-shaped rod, resilient components being placed on either side of said support following the longitudinal direction of the vehicle so as to provide bi-directional longitudinal shock absorption.

It thus becomes clear, as had been suggested above, that the various functions of suspension and shock absorption are provided by structurally distinct, but combinable, means which allow every mutual combination around the base structure of the main suspension with U-shaped rod, depending on the type of equipment required for vehicles according to their anticipated uses and/or the degree of comfort required.

It also becomes clear that the main intended application for the use of the invention lies in the suspension of a vehicle driver's cab, particularly for a land vehicle, and particularly an all-terrain vehicle, and more particularly still (although not exclusively) a farm tractor.

BRIEF DESCRIPTION OF THE DRAWING

The invention will be better understood by reading the following detailed description of some versions given as absolutely non-restrictive examples. In this description, reference is made to the appended drawings in which.

DETAILED DESCRIPTION OF THE INVENTION

In the whole set of drawings the outline of the main features of a vehicle are shown diagrammatically in a dotted lines, whereas the components specific to the invention are drawn in ordinary lines. The vehicle drawn as an example is a farm tractor with a suspended driver's cab, it being understood that the specifications of the invention can equally well be applied to numerous other types of vehicles.

Figure 1:
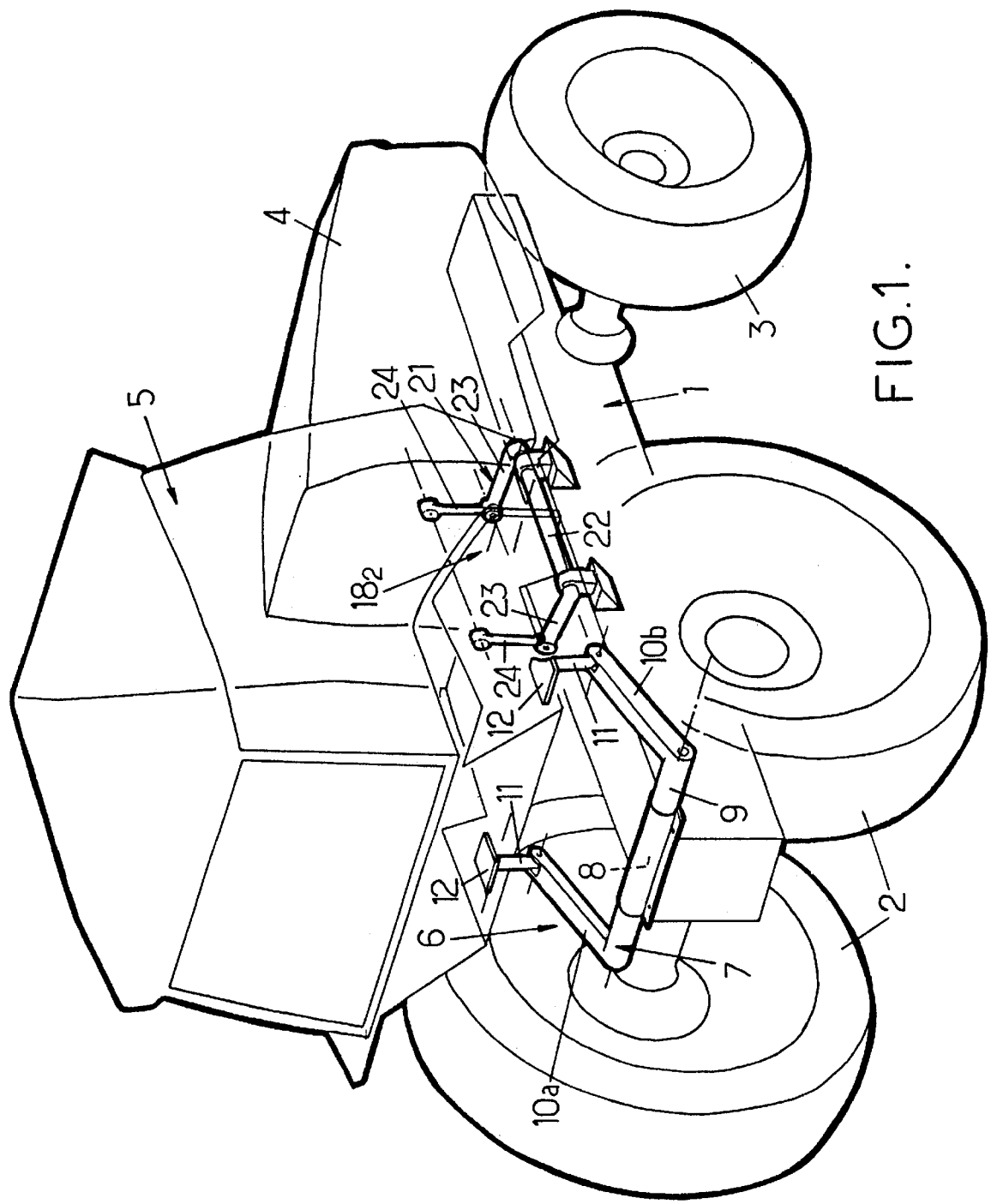
FIGS. 1 and 2 show diagrammatically, in perspective, two preferred versions respectively of a vehicle cab main suspension arranged according to the invention.

Referring firstly to FIG. 1, a vehicle such as a farm tractor comprises a frame 1 supported by a rear wheel axle unit 2 and a front wheel axle unit 3. Approximately the front half of the vehicle superstructure is occupied by drive means housed under a front bonnet 4 resting on the frame 1. Approximately the rear half of the vehicle superstructure is occupied by a driver's cab 5, located to the rear of the engine bonnet 4, and resting on the frame 1 by resilient suspension means 6.

As can be seen perfectly in FIG. 1, the resilient suspension means 6 essentially consist of a main generally U-shaped rod 7 interposed in approximately inclined or horizontal position between the frame 1 and the driver's cab 5, an actuator being connected to the U-shaped rod to determine its neutral position. In FIG. 1, the actuator is supposed to be of the passive type and constituted by a spring 8 housed in the U-shaped rod mounting 7.

In the example shown in FIG. 1, the U-shaped rod 7 is fixed, by its base 9 (or bottom of the U) to the frame 1, whereas the respective free ends of its arms 10*a* and 10*b* are articulated to rotate freely on the lower face of the cab 5 floor. For example, the articulation of the ends of the arms 10*a* and 10*b* is carried out on two respective spindles 11 integral with two plates 12 fixed to the cab floor.

Figure 10:
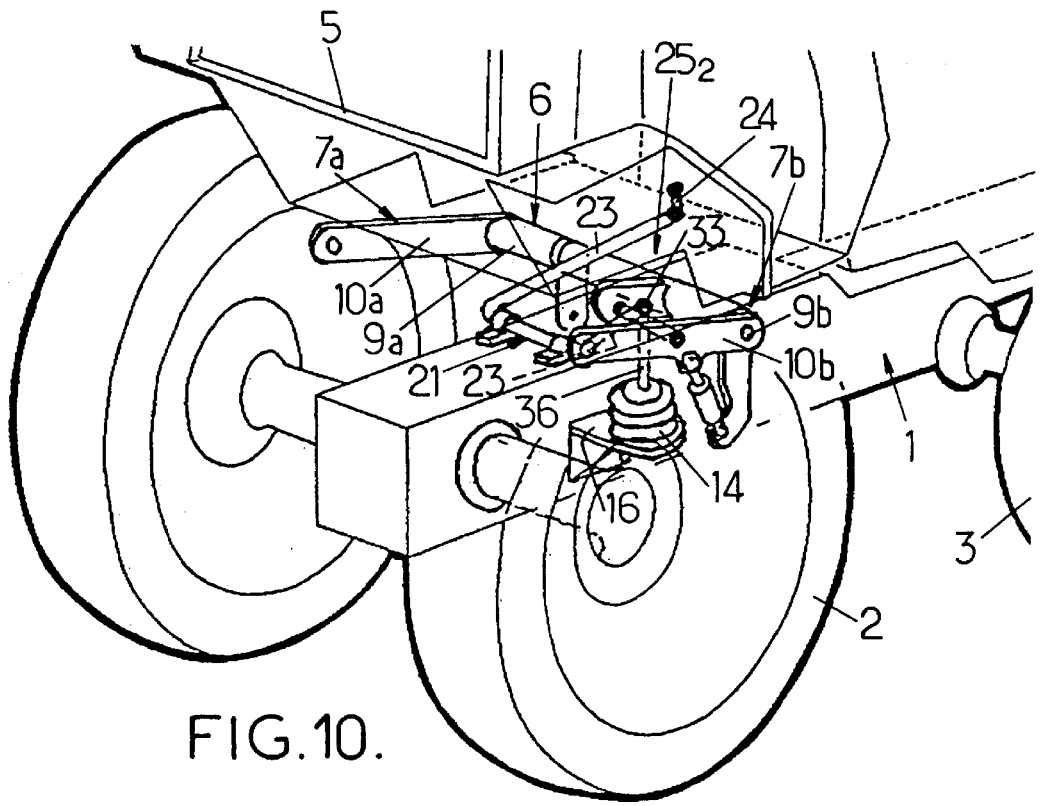

The base 9 of the U extends transversely to the vehicle longitudinal axis and approximately symmetrically relative to said axis. Said base 9 of the U is here located towards the rear of the frame whereas the two arms 10*a* and 10*b* extend towards the front of the vehicle. Clearly, a reverse arrangement could equally well be adopted, the base of the U being located towards the middle of the frame 1 and the two arms 10a and 10b extending towards the rear of the vehicle as shown in FIG. 10.

Likewise, the U-shaped rod 7 could be arranged in an upturned position, its base 9 being located at the top and fixed under the cab floor and the two arms 10a and 10b being inclined or horizontal downwards, forwards or backwards according to the arrangement selected, with their ends articulated to rotate on the frame.

Figure 2:
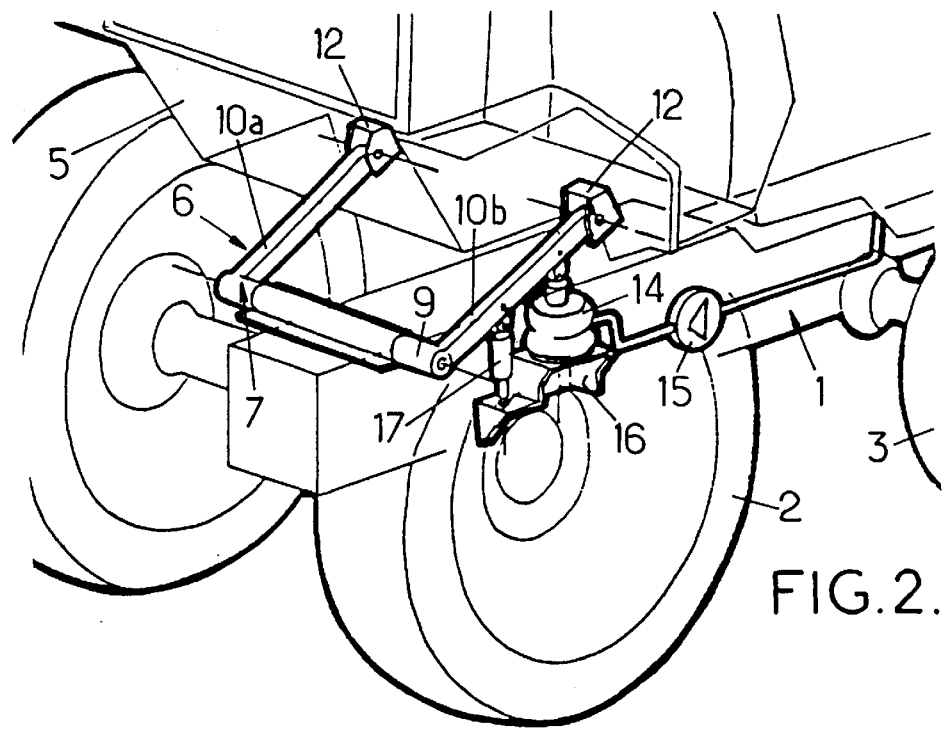

In FIG. 2 is shown a version variant of U-shaped rod suspension which uses an active actuator. This actuator may be of any professionally known type which is appropriate to ensure the required rod 7 retraction function. In this example, the active actuator includes a pneumatic spring 14 powered from a compressor (not shown) by means of an electrically operated valve 15; the pneumatic spring 14 is interposed between one of the rod 7 arms 10b and the frame or a support part such as a coupling plate 16 integral with the frame. A shock absorber 17 may be preferably placed in parallel on the spring 14 or combined with it. Preferably, to the pneumatic spring 14 are connected control means arranged so as to modify, either continuously, or discontinuously, the shock absorption curve of this pneumatic spring (dynamic control). In the assembly in FIG. 12, the plates 12 fixed under the cab are in the form of clamps and the ends of the arms 10a and 10b of the main rod 7 are directly connected to them with articulation.

It will be noted that the pneumatic spring additionally enables the neutral position level of the arm 10b, and therefore the height of the cab relative to the frame, to be adjusted.

The suspension 6 which has just been described is certainly appropriate to fulfil the essential function of resilient suspension of the cab 5 vis-à-vis the frame 1 and in this respect it represents the base structure which must be interposed between the cab and the frame. However, this suspension is not able, by itself, to fulfil auxiliary functions intended to improve cab stability, such as compensation for pitching motions, compensation for rolling motions and attitude correction, front-rear shock absorption, etc. It is then necessary to attach to the suspension 6 one or more auxiliary structures.

Furthermore, the suspension arrangement according to the invention provides only two support points for the cab and at least a third support point, or even additionally a fourth support point, must be provided furthermore so that the cab is supported in a stable way.

The flexibility of the suspension 6 is expressed by a front-rear vertical oscillation motion (pitching motion) of the cab which, for driver comfort and vehicle driving safety, it is very desirable to control.

Provision is therefore made, in this context, to attach to the main U-shaped rod 7, in a way functionally independent of the latter, cab oscillation or pitching motion control means 18 which, to advantage, can additionally be structurally arranged so as to constitute the aforesaid third (or even the aforesaid third and fourth) cab support point. The pitching motion control means 18 may make use of various technological solutions, among which can be counted, as examples, the following.

Figure 3:
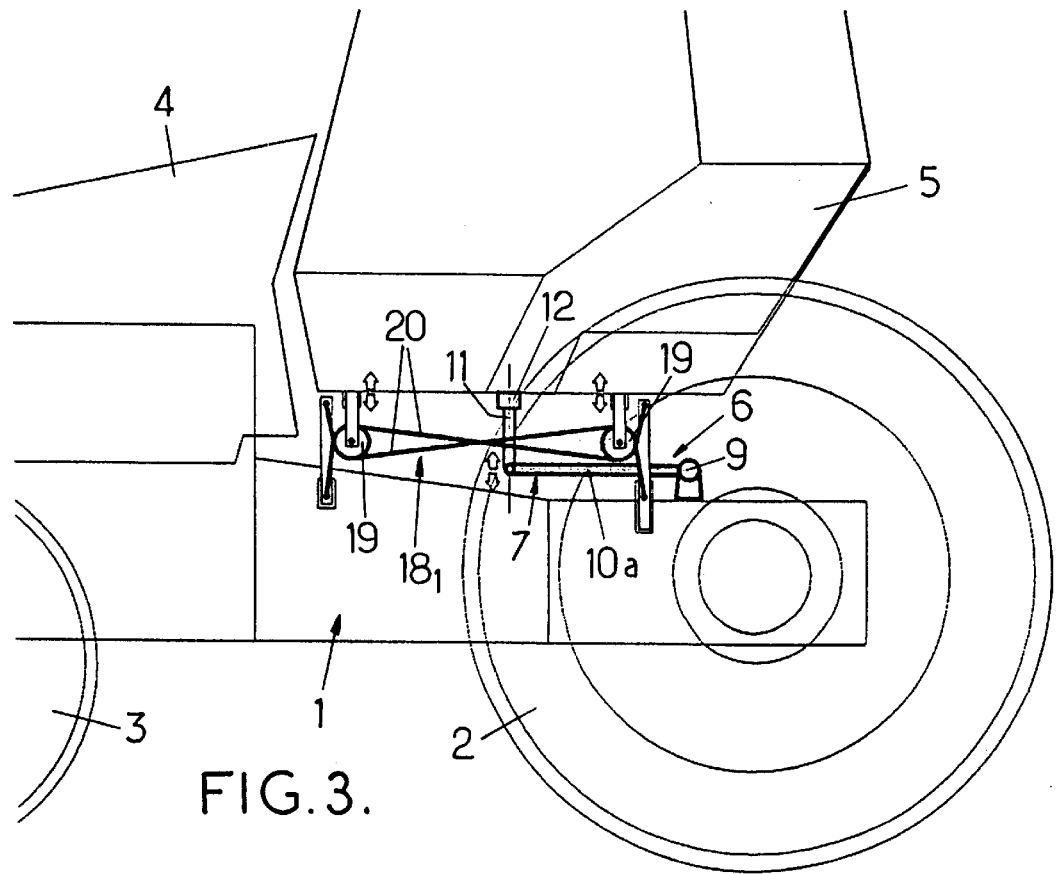
FIGS. 3 and 4 show, in side diagrammatic view, two versions respectively of cab pitching motion control means in association with main suspension means according to FIGS. 1 and 2.

In FIG. 3 in which the tractor is partially shown diagrammatically in side view, the resilient suspension 6 is of the type shown in FIG. 1. The pitching motion control means 18 include, on each side of the cab, two idlers 19 fixed to front and rear of the cab, under the latter. For its part the frame supports, on each side, two flexible connections 20 (cable made of stranded wire or synthetic material), superposed and crossed, between which are engaged the two rollers 19 in such a way that the two flexible connections 20 are conformed in two horizontal and intersecting Z shapes.

The flexible connections 20 thus constitute a race for the rollers 19 such that the cab is uncoupled from the frame 1 for all vertical oscillation motions induced by the suspension 6.

Figure 6:
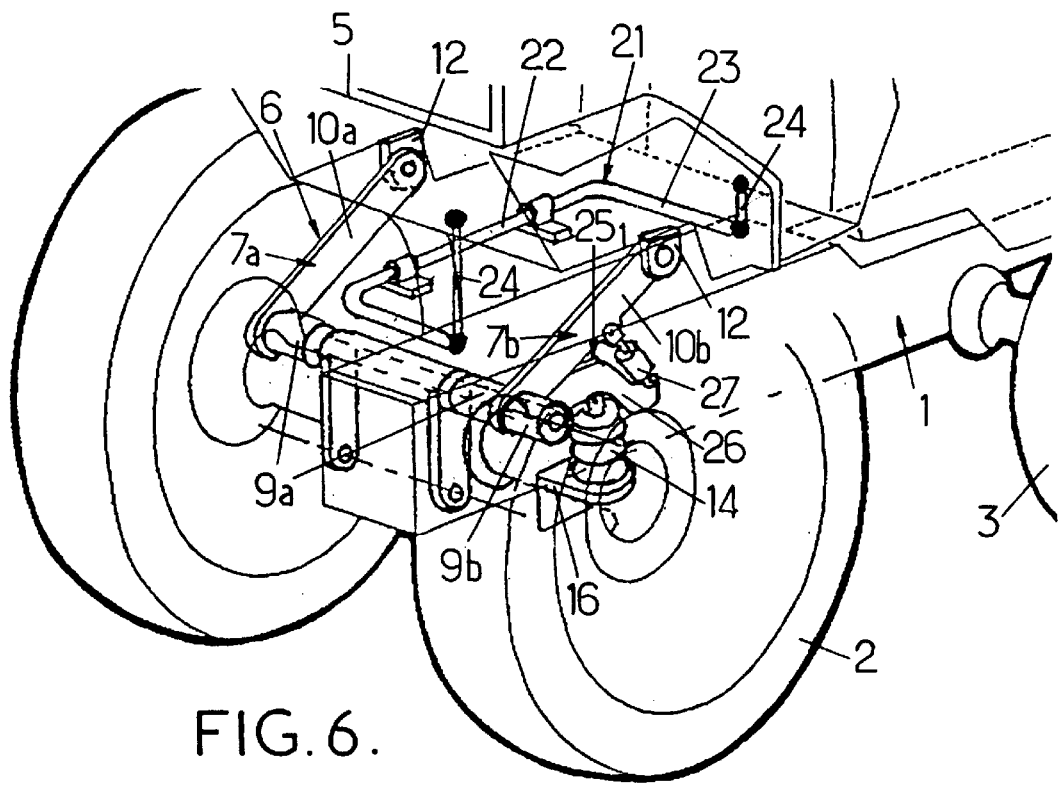
Figure 7:
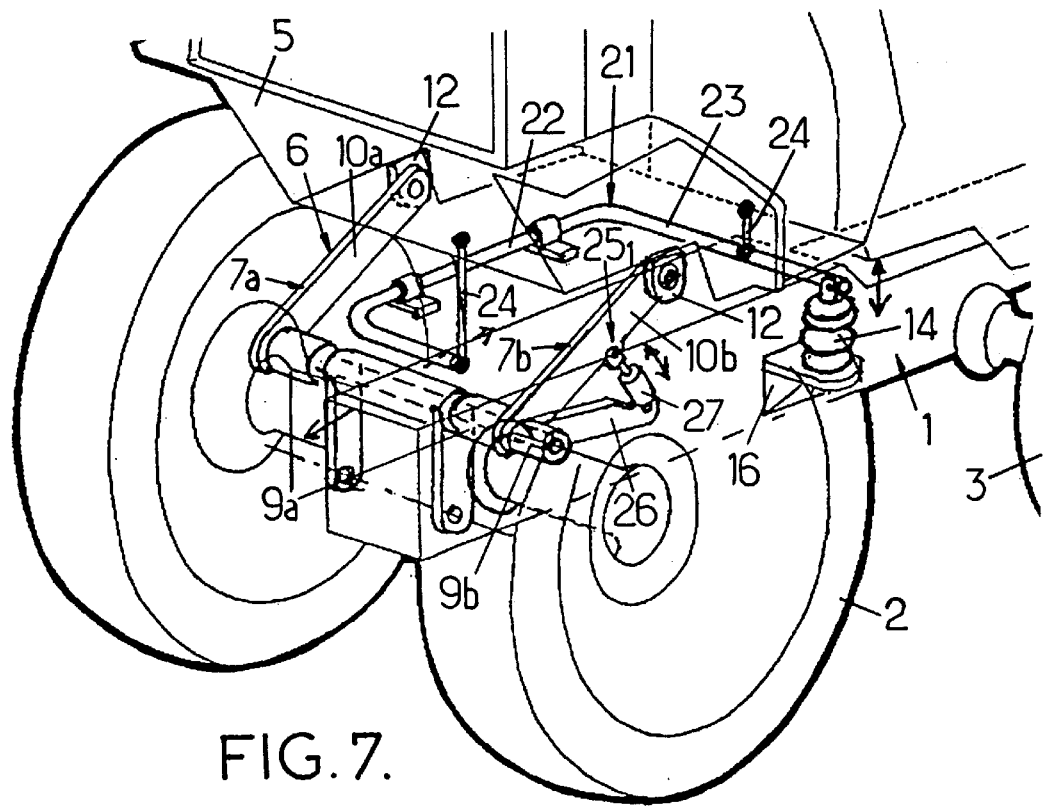

Another version of the pitching motion control means is shown in FIG. 1. The means $18_2$ include a secondary U-shaped rod denoted as 21 which is interposed between the cab and the frame. This U-shaped rod 21 may be placed so that its base 22 fixed to the frame extends parallel to the vehicle axis and so that its arms 23 extend transverse to said axis; at the ends of the arms 23 are articulated rods 24 connected, at their end, with articulation to the cab 5 floor. The two rods 24 may have different lengths if the cab 5 floor is not parallel to the frame as shown in FIGS. 6 and 7. Clearly, the U-shaped rod 21 could also be placed with its base 22 extending transverse to the frame as shown in FIG. 10.

Figure 4:
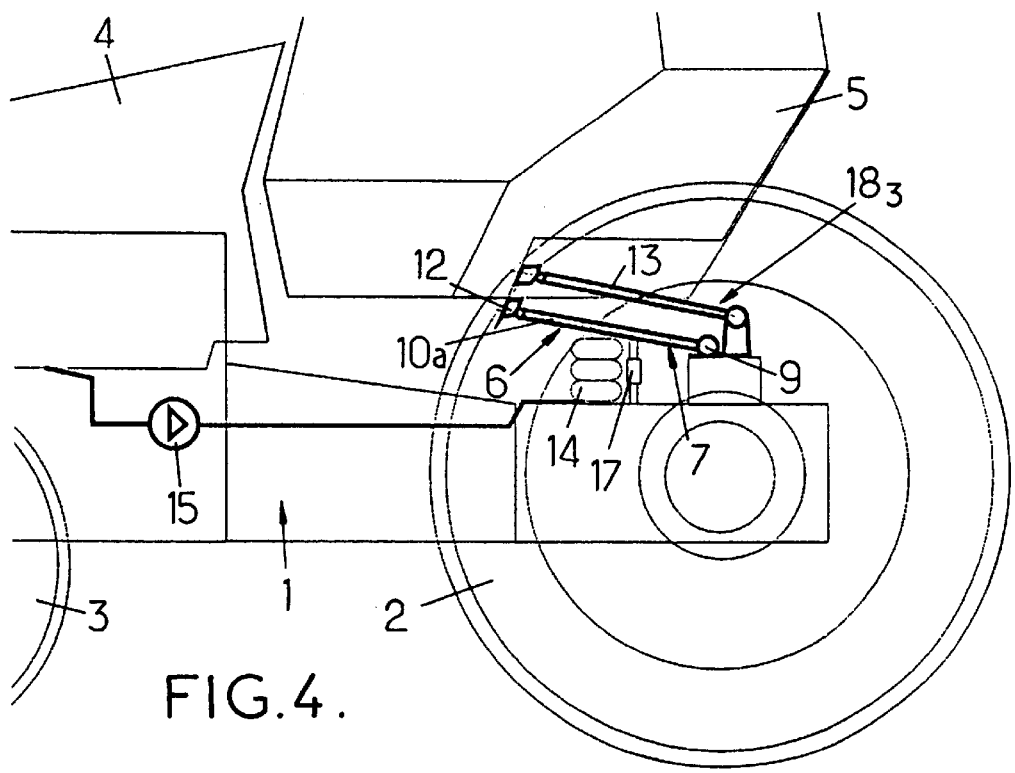

Yet another version of the pitching motion control means, denoted as $18_3$, is shown in FIG. 4 in which the tractor is shown, partially, in side view. The articulations 12 of the arms 10 on the cab are here such that said arms form two inclined struts. By way of example, for the rest the active actuator suspension has been shown in FIG. 2, including a pneumatic spring 14. The pitching motion control means 18 include at least one additional arm or strut 13 parallel to the arms 10 and articulated at its ends on the frame and cab respectively in such a way that the main rod 7 and the strut 13 constitute a deformable parallelogram capable of countering the relative pitching motion of the cab vis-à-vis the frame. There may be a single strut 13 placed in any appropriate location, for example being located on the side and placed above or below one of the arms 10a and 10b, or else being located between the arms 10a and 10b above or underneath the plane formed by these so that the system forms a deformable parallelogram. Likewise, the pneumatic spring 14 may equally well be interposed between the frame and the strut 13. It is also possible to provide two struts connected respectively to the two arms 10a 10b.

Furthermore, to the cab 5 resilient suspension means may be additionally connected to cab rolling motion control and transverse attitude correction means 25, said means solely being able to be connected to the main suspension means or else to be connected to the latter in combination with aforesaid pitching control means. A few version examples of this are given below.

Figure 5:
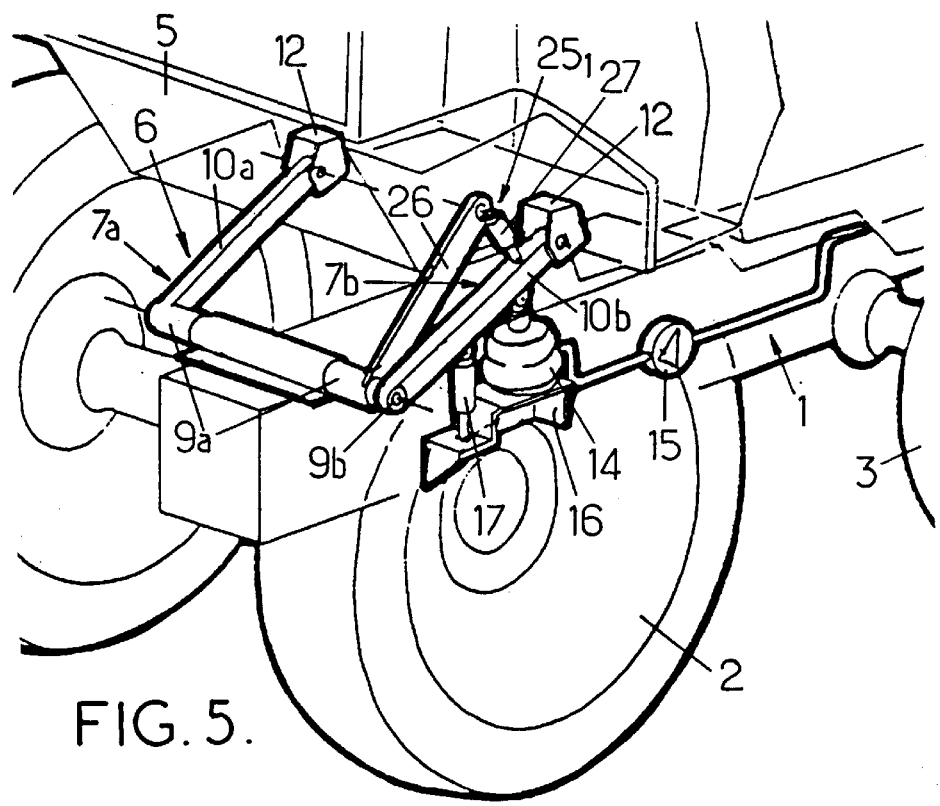
FIGS. 5 to 13 show diagrammatically, either in perspective or from the side, different versions of cab rolling motion control and roll compensation means in association with the main suspension means in FIGS. 1 and 2, and possibly in combination with pitching control means.

As shown in FIG. 5, the rolling motion control and transverse attitude correction means 251 use a particular structure of the main rod 7, namely that the rod is constituted in two independent parts; a half-rod 7a is formed by a half-base 9a and the corresponding arm 10a, whereas the other half-rod 7b is disconnected from the previous one and is formed by a half-base 9b (coaxial to the half-base 9a and in its extension) and the corresponding arm 10b. As an example, an active actuator formed by the pneumatic spring 14 and the shock absorber 17 has been connected to the arm 10b according to the diagram in FIG. 2.

The fixing of the two arms 10a and 10b is obtained by providing resilient means between the one and the other. In the version shown in FIG. 5, an auxiliary arm 26, integral with the base 9a, extends close to the arm 10b and an actuator 27 is interposed between the auxiliary arm 26 and the arm 27 so that the arm 10a is uncoupled from the arm 10b.

The pneumatic actuator 14 and the shock absorber 17 provide the cab suspension, as well as the cab height adjustment, as shown in FIG. 2, whereas the independence of the two arms 10a, 10b coupled up by the actuator 26 provides control of the transverse motion of the cab. In order to be certain of the functional independence of these two controls, it is desirable to use a rigid response actuator 26.

Clearly, the same functions may be obtained by using structural arrangements which differ from the one in FIG. 5, which is shown only by way of example, in which the auxiliary arm 26 extends above the arm 10b and the pneumatic spring 14 is connected to the arm 10b.

By way of clarifying concepts FIGS. 6 and 7 show two further examples of the same type. In FIG. 6, the auxiliary arm 26 extends under the arm 10b, whereas the pneumatic actuator 14 is interposed between said auxiliary arm 26 and the frame. In FIG. 7, the auxiliary arm 26 also extends under the arm 10b; but the pneumatic actuator 14 is transferred to the end of one of the arms 23 of the U-shaped rod 21 providing pitching motion control.

Another version $25_2$ of the cab rolling motion control means consists in placing the auxiliary arm 26, integral with one of the arms of the suspension U-shaped rod, approximately parallel to the latter, in coupling it mechanically by a crossbar with the other arm (which is disconnected from it), of the suspension U-shaped rod and in controlling the oscillation of said crossbar in an approximately vertical plane so as to offset the cab rolling motion.

Figure 8:
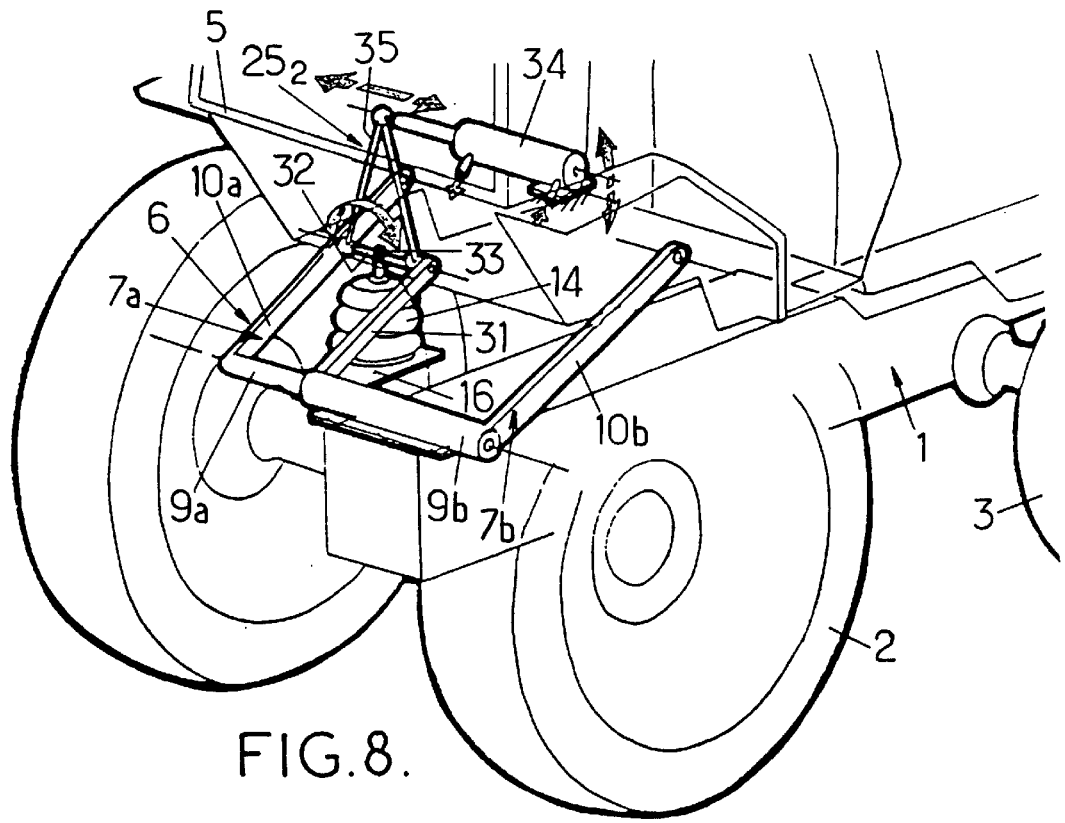

A first version example of the rolling motion compensation means $25_2$ is shown in FIG. 8. Here, the auxiliary arm or strut 31 is integral with the half-rod 7b and extends, from the half-base 9b, approximately parallel to the arm 10b. The strut 31 and the other arm 10a are connected by a crossbar 32 which is susceptible to an oscillating motion, in an approximately vertical plane, around a median articulation 33. Control of this oscillating motion may be obtained by means of an actuator 34 (for example a hydraulic or air jack) the rod of which being approximately parallel to the crossbar 32 is coupled to the latter by a rigid connection 35. To advantage, the median articulation 33 of the crossbar 32 is placed at the end of the pneumatic active actuator 14 rod which is responsible for the cab suspension and height adjustment function.

Figure 9:
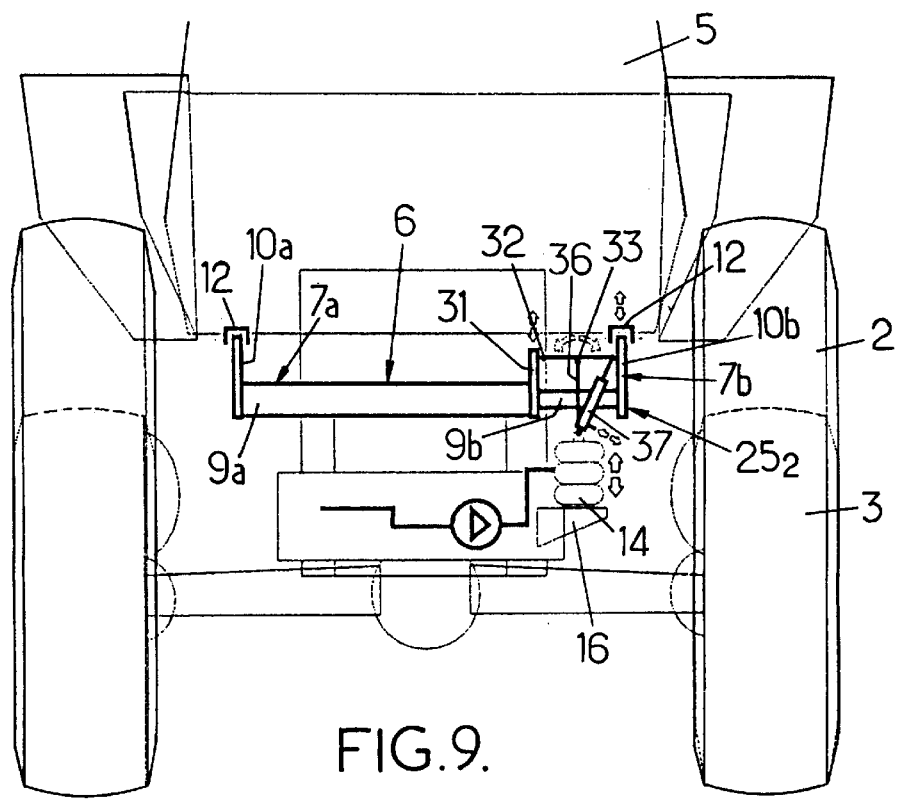

FIG. 9 shows, in an end view, another version example of the rolling motion compensation means $25_2$ the composition of which is close to that shown in FIG. 8. Here however the rod 36 of the pneumatic active actuator is elongated so as to separate the crossbar 32 from the actuator 14 and the second actuator 37, such as an air or hydraulic jack, is placed at an angle between the foot of the rod 35 and the connection point between the crossbar 32 and the arm 10b.

Yet another version example of the means $25_2$, with oscillating crossbar 32, is shown in FIG. 10. Here the main U-shaped rod 7 providing the cab suspension is placed contrary to the arrangements shown in the previous diagrams, and the U-shaped rod 21 providing the pitching motion control is placed longitudinally relative to the frame, and not transverse as shown in FIG. 1. One of the arms 23 of the U-shaped rod 21 remains connected to the cab floor by the rod 24 so as to constitute a third cab support point. But the other arm 23 of the rod 21 is connected with the possibility of rotation to the aforementioned median articulation 33 of the crossbar 32 on the pneumatic actuator 14 rod. By means of this arrangement, the actuator 14 provides the cab height adjustment by acting simultaneously on its three support points.

The rolling motion compensation means may also use, in another version, an arrangement $25_3$ in a resiliently deformable rhombus interposed between the arms 10a and 10b.

Figure 11:
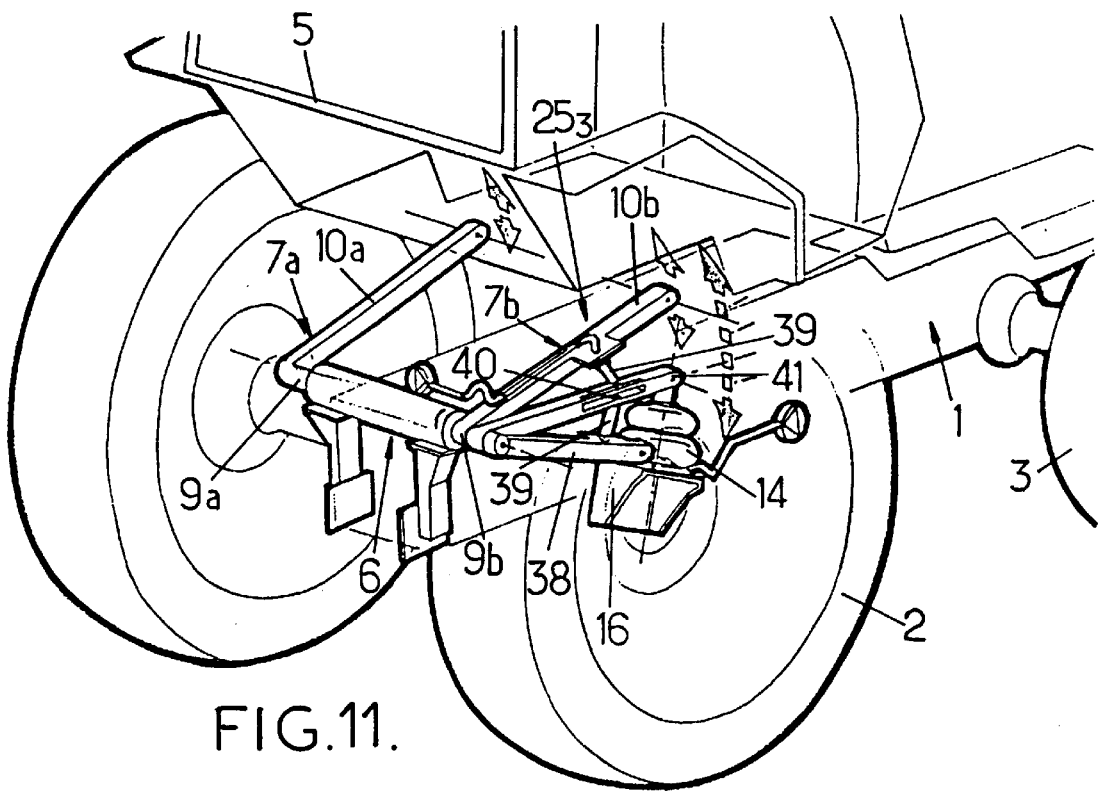

A version example of such means $25_3$ is shown in FIG. 11. An auxiliary arm or strut 38 is integral with the arm 10a at the opposite end of the half-base 9a and is moved angularly (here downwards) relative to the arm 10a so as to extend close to the arm 10b and approximately under it. Two rods 39, articulated by one of their ends on the arm 10b and the strut 38 respectively, are articulated to each other by their other end, in such a way that the arm 10a, the strut 38 and the two rods 39 form a deformable rhombus. A bi-directional retraction force towards a reference position is provided by a pair of springs 40 mounted in opposition on the articulation of the rods 39. To ensure the correct operation of the system, the articulation of the two rods 39 and the springs 40 are enclosed in a tubular guide 41 which extends approximately along the bisector of the angle formed by the arm 10b and the strut 38, the two rods 39 being approximately of the same length. The pneumatic actuator 14 is, here, interposed between the frame (coupling plate 16) and the end of the guide 41 so that it can fulfil its dual function of main rod (7a, 7b) retraction and height adjustment of the cab relative to the frame.

The rolling motion compensation means may also use, in another version, an arrangement $25_4$ with contra-rotating rotating components coupled between the arms 10a and 10b.

Figure 12:
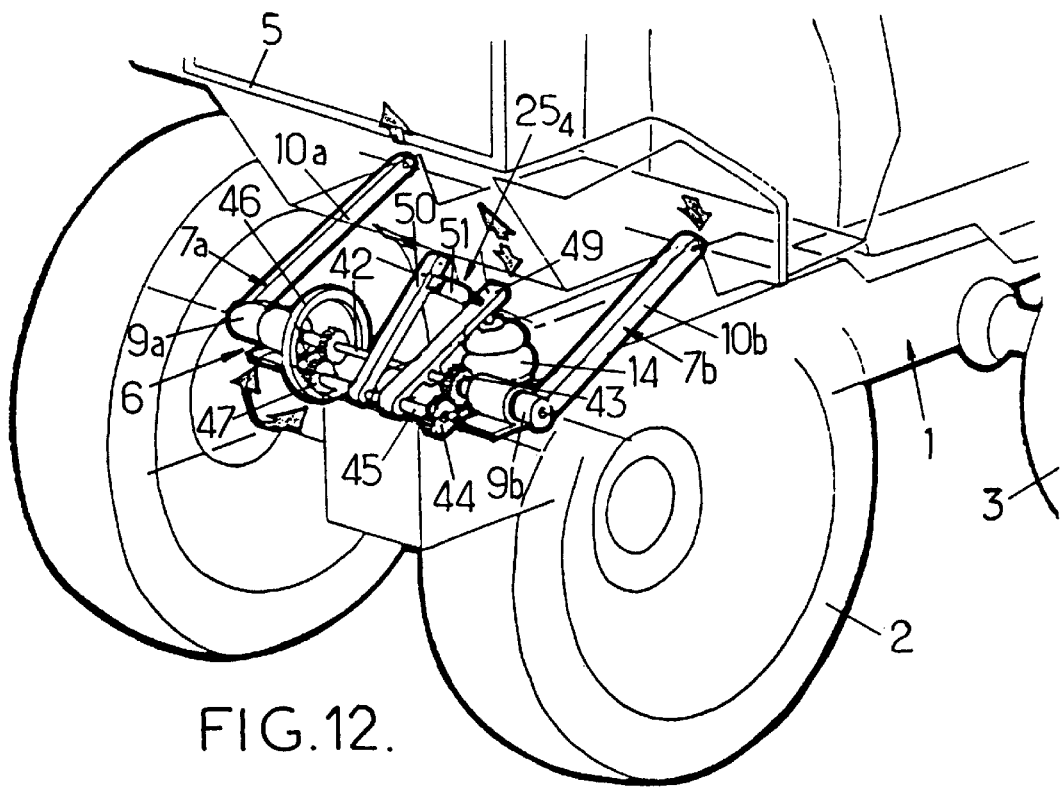

A first version example of such means $25_4$ is shown in FIG. 12. The half-base 9b connected to the arm 10b comprises a shaft 42, coaxial to the half-bases 9a and 9b, with which is integral a pinion 43 meshing with a pinion 44 mounted fixed to a dummy shaft 45 parallel to the shaft 42. To the half-base 9a is connected an epicyclic train including a hollow internally toothed gear 46 integral with the half-base 9a, coaxial to the shaft 42, with which meshes an internal gear 47 integral with the shaft 45 to which it is coupled in translation, but not in rotation.

On the shaft 42 is loose mounted an arm 49 one end of which is connected to the pneumatic actuator 14 supported by the frame and the other end of which is mounted to rotate freely on the shaft 45. In the same way the shaft 45 is integral with the end of another arm 50 which extends close to the arm 49 by being moved angularly relative to the latter and an actuator 51 is interposed between the other end of the arm 50 and the arm 49.

Any movement of one of the arms 10a, 10b causes, through means 42–51, an approximately identical movement and in the opposite direction of the other arm, so that the cab rolling motion is eliminated. The pneumatic actuator 14 retains its dual function of cab pitching motion and height adjustment control relative to the frame.

Figure 13:
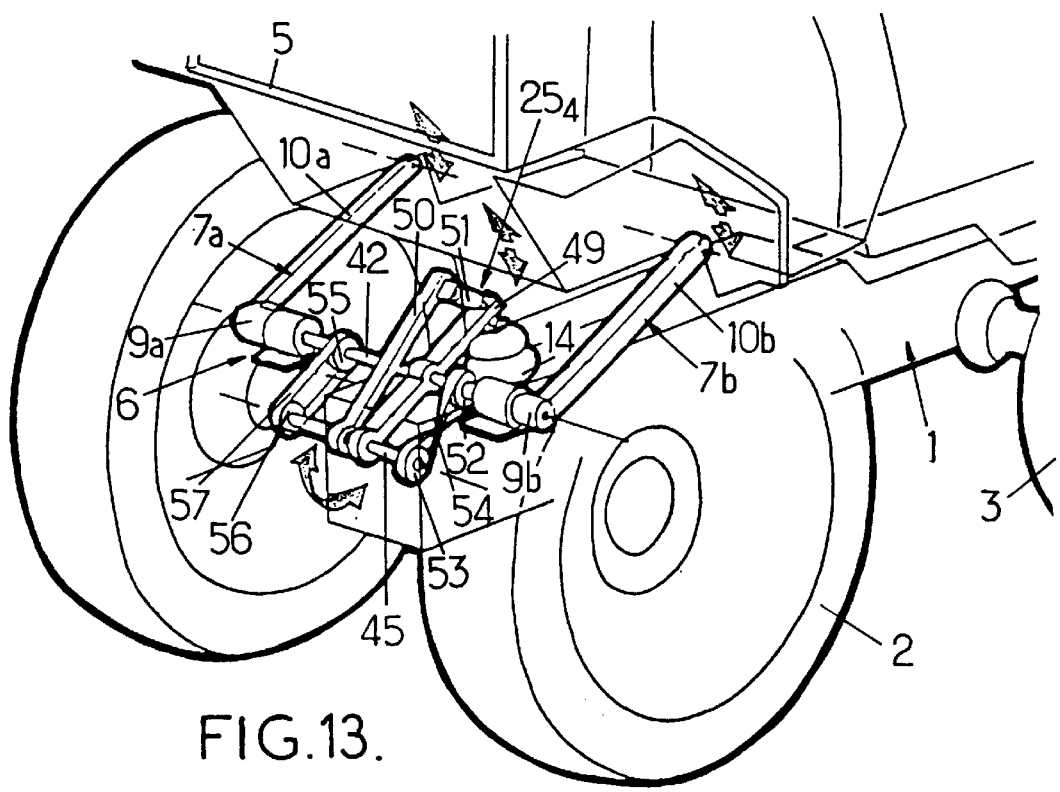

FIG. 13 shows another version example of the means $25_4$ in which the pairs of gears in the example in FIG. 12 are replaced by endless link transmissions. To this end, the gears 43 and 44 are replaced by two wheels 52 and 53 wedged on the shafts 42 and 45 respectively and supporting an endless link 54 with crossed strands so that the shafts 42 and 45 rotate in opposite directions from each other. In the same way the gears 46 and 47 are replaced by wheels 55 and 56 respectively integral with the half-base 9a and the shaft 48 respectively and supporting an endless link 57 with parallel strands so that the two wheels 55 and 56 rotate in the same direction. The wheels and the endless links have to ensure rotation without creep and may be toothed wheels and chains or else pulleys and notched belts, particularly.

Lastly, it may be desirable to provide means suitable to absorb, at cab level, the front-rear shocks to which the vehicle is subjected, such as for example those transmitted by a trailer coupled to the vehicle. It is necessary to this end for not only the cab, but also all the components of the means of suspension and control of its motions to be disconnected from the frame with dual longitudinal resilient retraction forwards and backwards respectively.

Figure 14:
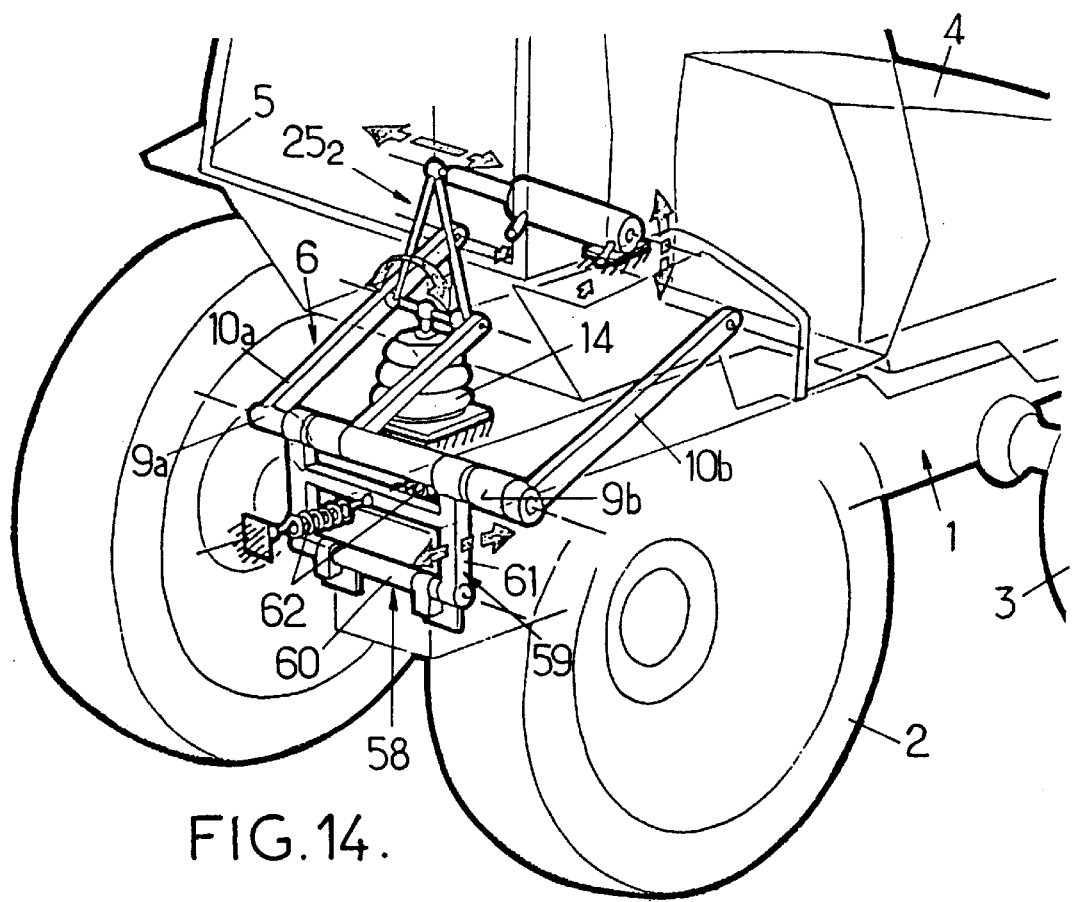
FIG. 14 shows diagrammatically, in perspective, a preferred version of front-rear shock absorption means to which the cab is subjected.

FIG. 14 shows a version of such means 58 which are here, as an example, connected to the suspension and rolling motion control means in FIG. 6, but which, clearly, could be connected to all the other types of means given above.

The means 58 consist of a sub-frame which is interposed between the frame and the main U-shaped rod 7 of the cab main suspension 6. The sub-frame 59 may for example consist of an approximately vertical frame which is mounted (for example by one of its crossbars 60) rotating on the vehicle frame 1 whereas its upper part (for example its uprights 61) supports freely articulated the half-bases 9a, 9b of the main U-shaped rod 7 of the main suspension 6. Two springs 62 are mounted at the front and at the back respectively of the frame, with the possibility of connecting shock absorbers to them.

The sub-frame could also be arranged, for example in the form of a carriage connected to the frame with resilient retraction, so as to support additionally the pitching motion control means of the cab, with the result that the latter would then be totally disconnected from the frame while retaining all the stabilising means envisaged in the context of this invention.

Clearly, only a few version examples of the means provided according to the invention have been more particularly described above and shown on the appended drawings, and numerous other version forms could be envisaged. However, these examples are sufficient to understand that the cab main suspension 6 may be achieved in a particularly straightforward and cost-effective manner, while it may be implemented singly or in combination with additional means appropriate to fulfil optional functions; said additional means may themselves be implemented singly with the main suspension or connected, with each other, according to numerous possible combinations, in combination with the main suspension. In this way a modular structure is constituted which is appropriate to fulfil a greater of lesser number of functions, according to the degree of comfort and safety that it is wished to confer on the cab, and that as a function of the price of the vehicle. It must also be pointed out that the functions provided use a very small number of active actuators (one, or two at the most) which entails a very substantial reduction in the cost of the whole suspension.

I claim:

1. A work vehicle comprising a frame and a cab supported by said frame by resilient suspension means,
   wherein the resilient suspension means include a main U-shaped rod interposed in inclined or horizontal position between the frame and said cab, a main actuator being connected to said main U-shaped rod to determine its neutral position,
   wherein pitching motion control means of the suspended cab are connected to said resilient suspension means and wherein said pitching control means include a secondary U-shaped rod, interposed between the frame and the cab, said secondary rod determining at least a third cab support point not aligned with said two support points determined by the main U-shaped rod.

2. A work vehicle according to claim 1, wherein the pitching control means include at least one rod parallel to the arms of the main U-shaped rod and connected with articulations to the cab and to the frame, said rod extending outside the plane determined by the main U-shaped rod so that a deformable parallelogram layout is formed and interposed between the cab and the frame.

3. A work vehicle according to claim 1, wherein the pitching control means include at least two superposed cross belts, integral with the frame, determining a race for two rollers, separated longitudinally from each other, supported by the cab.

4. A work vehicle according to claim 1, wherein rolling motion control and transverse attitude correction means are connected to the resilient suspension means, the main U-shaped rod being constituted by two half-rod the respective arms of which are angularly independent of each other and between which are interposed said means.

5. A work vehicle according to claim 4, wherein the rolling motion control means include shock absorption means interposed between one of the arms and a strut which is integral with the other arm being located close to and above or below the aforesaid first mentioned arm.

6. A work vehicle according to claim 4, wherein the rolling motion control means include an oscillating crossbar which is supported centrally and which joins together the two arms of the main U-shaped rod, second actuator means being connected to said crossbar to bring about its controlled oscillation.

7. A work vehicle according to claim 4, wherein the rolling motion control means include shock absorption means in a deformable rhombus determined by one of said arms, an auxiliary arm integral with the other arm and two rods articulated on these and joined to each other with articulation and dual resilient retraction.

8. A work vehicle according to claim 4, wherein the rolling motion control means include contra-rotating rotating components appropriate for converting the displacement travel of one of the arms in one direction into displacement travel in the opposite direction and of the same amplitude of the other arm.

9. A work vehicle according to claim 1, wherein front-rear shock absorption means which are interposed between the frame and at least the cab suspension means are additionally connected to the resilient suspension means.

10. A work vehicle according to claim 9, wherein the front-rear shock absorption means include a sub-frame oscillating mounted with free rotation on the frame and supporting the main U-shaped rod, resilient components being placed on either said of said support according to the longitudinal direction of the vehicle in order to provide bi-directional longitudinal shock absorption.

11. A farm tractor comprising a frame and a cab supported by said frame by resilient suspension means,
    wherein the resilient suspension means include a main U-shaped rod interposed in inclined or horizontal position between the frame and said cab, a main actuator being connected to said main U-shaped rod to determine its neutral position,
    wherein pitching motion control means of the suspended cab are connected to said resilient suspension means, and wherein said pitching control means include a secondary U-shaped rod, interposed between the frame and the cab, said secondary rod determining at least a third cab support point not aligned with said two support points determined by the main U-shaped rod.

* * * * *